United States Patent
Gotou

(10) Patent No.: US 9,784,906 B2
(45) Date of Patent: Oct. 10, 2017

(54) LIGHTING DEVICE, DISPLAY DEVICE, AND TELEVISION DEVICE

(71) Applicant: Sharp Kabushiki Kaisha, Osaka-shi, Osaka (JP)

(72) Inventor: Akira Gotou, Osaka (JP)

(73) Assignee: Sharp Kabushiki Kaisha, Sakai (JP)

( * ) Notice: Subject to any disclaimer, the term of this patent is extended or adjusted under 35 U.S.C. 154(b) by 24 days.

(21) Appl. No.: 14/895,524

(22) PCT Filed: Jul. 8, 2014

(86) PCT No.: PCT/JP2014/068131
§ 371 (c)(1),
(2) Date: Dec. 3, 2015

(87) PCT Pub. No.: WO2015/008656
PCT Pub. Date: Jan. 22, 2015

(65) Prior Publication Data
US 2016/0131826 A1    May 12, 2016

(30) Foreign Application Priority Data

Jul. 16, 2013 (JP) ................................. 2013-147429

(51) Int. Cl.
*F21V 8/00* (2006.01)
(52) U.S. Cl.
CPC .......... *G02B 6/0085* (2013.01); *G02B 6/0088* (2013.01); *G02B 6/0091* (2013.01)
(58) Field of Classification Search
CPC .. G02B 6/0085; G02B 6/0091; G02B 6/0088; G02B 6/0073; G02B 6/009; G02B 6/005;
(Continued)

(56) References Cited

U.S. PATENT DOCUMENTS

| 2012/0026753 A1 | 2/2012 | Shiraishi et al. |
| 2012/0069263 A1* | 3/2012 | Hur ............... G02B 6/0038 349/61 |

(Continued)

FOREIGN PATENT DOCUMENTS

| JP | 2012-033420 A | 2/2012 |
| WO | 2011/080954 A1 | 7/2011 |
| WO | 2013/054732 A1 | 4/2013 |

OTHER PUBLICATIONS

Official Communication issued in International Patent Application No. PCT/JP2014/068131, mailed on Sep. 22, 2014.

*Primary Examiner* — Thoi Duong
(74) *Attorney, Agent, or Firm* — Keating & Bennett, LLP

(57) ABSTRACT

A backlight device includes LEDs, a light guide plate, and a heat dissipation member. The light guide plate includes edge surfaces including a light entrance surface through which light from the LEDs enters, a front plate surface as a light exit surface through which the light from the LEDs exits, and another plate surface as an opposed surface on an opposite side from the light exit surface. The heat dissipation member having heat dissipating properties includes a bottom plate portion extending along the opposed surface on an opposed surface side, and an upstanding portion extending from the bottom plate portion toward the light exit surface. The bottom plate portion includes projections projecting toward the light exit surface and facing short-side edge surfaces of the light guide plate. The projections are stopped at the corresponding edge surfaces to restrict a distance between the LEDs and the light entrance surface.

13 Claims, 14 Drawing Sheets

(58) Field of Classification Search
CPC ... G02B 6/00; G02B 6/0028; G02F 1/133308;
G02F 1/133615; G02F 1/133; G02F
1/1333; G02F 1/1335; G02F 1/1336;
G02F 1/133608; G02F 1/133382; G02F
1/133385; G02F 1/133603; G02F
1/133524; G02F 2201/36; H04N 9/3144;
H04N 3/127; H05K 2201/10136; H05K
2201/10106; G09F 13/18; G09F 9/30;
G09F 9/33; G09F 9/35
USPC .......... 349/65, 58, 62, 67, 72; 362/611, 612,
362/613, 621, 600, 610, 615, 97.1, 97.2,
362/97.3, 631, 632, 633, 635; 348/794,
348/790, 836; 361/752, 679.01, 748
See application file for complete search history.

(56) References Cited

U.S. PATENT DOCUMENTS

2012/0170311 A1* 7/2012 Huang ................. G02B 6/0088
362/611
2012/0257107 A1 10/2012 Itoh \* cited by examiner

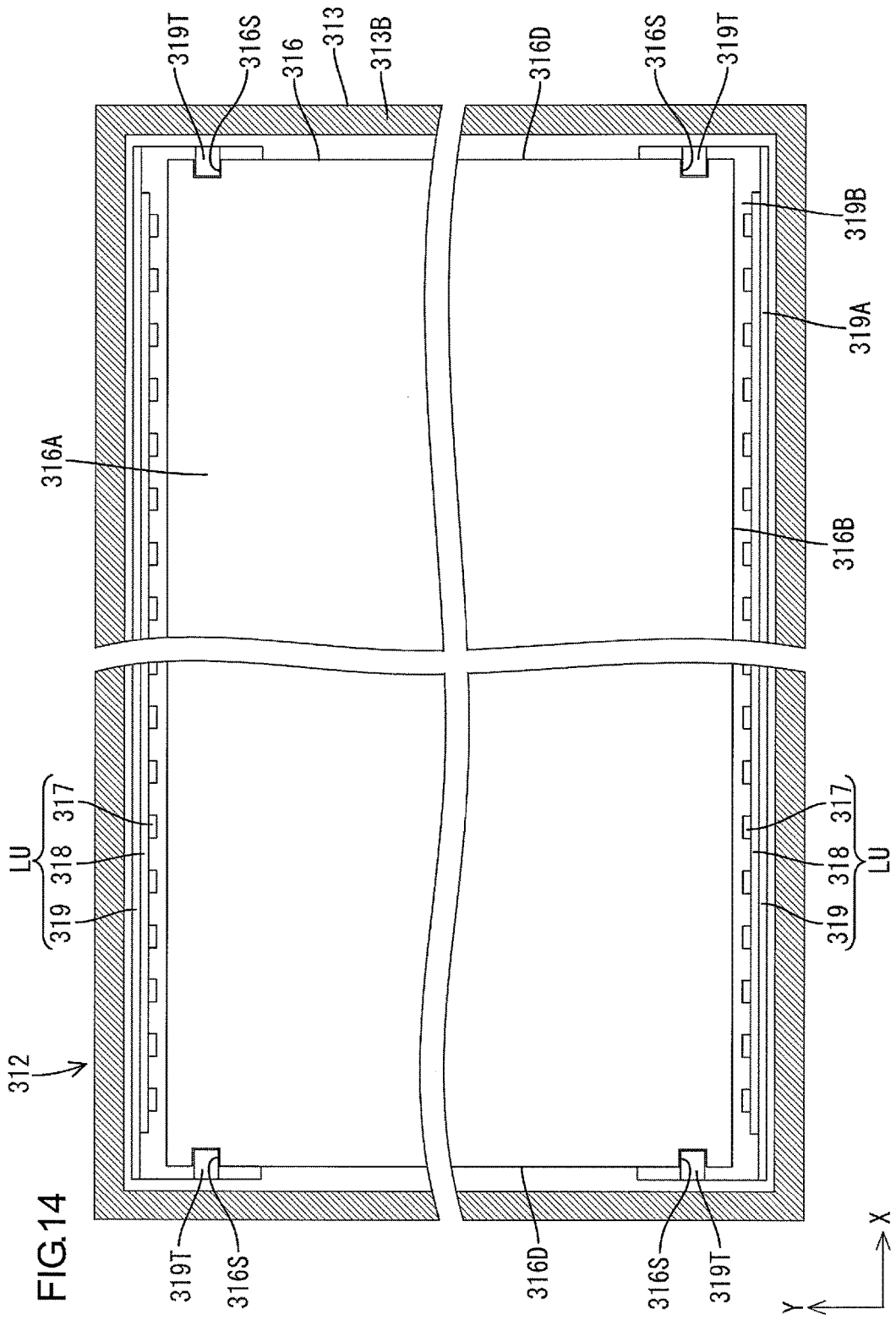

LIGHTING DEVICE, DISPLAY DEVICE, AND TELEVISION DEVICE

TECHNICAL FIELD

The present invention relates to a lighting device, a display device, and a television device.

BACKGROUND ART

In liquid crystal display devices such as liquid crystal television devices, liquid crystal panels that are display panels do not emit light. Therefore, liquid crystal display devices require backlight devices as external lighting devices. The backlight devices are classified broadly into a direct type and an edge-light type based on mechanisms. For further reduction in thicknesses of the liquid crystal display devices, the edge-light type backlight devices are more preferable.

In the edge-light type backlight device, a light guide plate may thermally expand and the expansion of the light guide plate may change the distance between a light source, such as LEDs, and the light guide plate and this may degrade light use efficiency of light emitted by the light sources. It has been known that fixing members that fix a board including the light source thereon to the light guide plate are provided to maintain such a distance between the light source and the light guide plate constant and thus an optical design is maintained preferable. A lighting device including such a configuration is disclosed in Patent Document 1. In the lighting device, a printed circuit board including LEDs thereon includes positioning bosses that are fitted in holes of a light guide plate. According to this configuration, the distance between the LEDs and the light guide plate may be maintained constant.

RELATED ART DOCUMENT

Patent Document

Patent Document 1: Japanese Unexamined Patent Application Publication No. 2012-33420

Problem to be Solved by the Invention

However, the positioning bosses of the lighting device in Patent Document 1 are separate components from the printed circuit board on which the light sources are mounted. Therefore, each of the positioning boss and the light guide plate may have variation in size and variation in manufacturing. If such variation exists in the lighting devices, a distance between the light source and the light guide plate is not maintained constant among the lighting devices, and a preferable optical design is less likely to be maintained in each of the lighting devices.

DISCLOSURE OF THE PRESENT INVENTION

A technology disclosed herein was made in view of the above circumstances. An object is to provide a technology of reducing variation in size of components and maintaining a preferable optical design.

Means for Solving the Problem

A technology described in this description relates to a lighting device including a light source, a light guide plate, and a heat dissipation member. The light guide plate includes a light exit surface that is at least one of edge surfaces, a light exit surface that is a plate surface thereof, and an opposed surface that is an opposite side surface from the light exit surface. Light from the light source enters the light guide plate through the light entrance surface. The light from the light source exits the light guide plate through the light exit surface. The heat dissipation member has a heat dissipating property and includes a bottom plate portion and an upstanding portion. The bottom plate portion extends along the opposed surface on an opposed surface side of the light guide plate. The upstanding portion extends from the bottom plate portion toward the light exit surface. The bottom plate portion includes a projection extending toward the light exit surface and facing at least one of the of the edge surfaces. The projection is stopped at the at least one of the edge surfaces and configured to restrict a distance between the light source and the light entrance surface.

According to the lighting device, the projection of the heat dissipation member is stopped at the edge surface of the light guide plate and thus the distance between the light source and the light entrance surface is restricted. Therefore, even when the light guide plate thermally expands, the distance between the light source and the light entrance surface is less likely to change. Thus, optical properties are maintained preferable. Further, the projection is a unitary portion of the heat dissipation member. This configuration does not require additional components to restrict the distance between the light source and the light entrance surface, and thus variations in size and variation in manufacturing that may be caused by such additional components are reduced. That is, in the above lighting device, the variation in size of components is decreased and an optical design is maintained preferable.

The lighting device may further include a reflection sheet that is disposed between the opposed surface of the light guide plate and the bottom plate portion of the heat dissipation portion of the heat dissipation member. The projection is stopped by the reflection sheet and configured to restrict a movement of the reflection sheet in a direction perpendicular to the light entrance surface.

According to this configuration, the reflection sheet is restrained to move in the direction perpendicular to the light entrance surface by the projection. Therefore, even when the reflection sheet thermally expands, a distance between the light source and the reflection sheet is less likely to change. Accordingly, function of the reflection sheet is not or less likely to be degraded, and thus brightness of light that exits through the light exit surface is not or less likely to be decreased.

The edge surfaces of the light guide plate may include an adjacent surface that is adjacent to the light entrance surface. The adjacent surface may include a cut portion that faces the projection and in which the projection is fitted.

Accordingly, a specific configuration of how the edge surface of the light guide plate and the projection of the heat dissipation member are fixed to each other is provided.

The light guide plate may include the cut portion not overlapping a range of a distribution of light that enters through the light entrance surface.

According to this configuration, light that enters the light guide plate through the light entrance surface is less likely to be blocked by the projection that is fitted in the cut portion. Thus, uneven brightness that is resulted from the blocking of the light is less likely to occur in the light exit surface.

The projection may include an attaching portion that is attached to the light entrance surface.

According to this configuration, a configuration that restricts the distance between the light source and the light entrance surface is obtained by the projection without forming a cut portion in the light guide plate. That is, it is not necessary to process the light guide plate and thus the manufacturing process of the lighting device is simplified.

The attaching portion may be attached at a portion of the light entrance surface of the light guide plate not overlapping a range of a distribution of light that enters through the light entrance surface.

According to this configuration, light that enters through the light entrance surface is less likely to be blocked by the attaching portion. Thus, reduction in brightness of light that exits through the light exit surface is less likely to be caused by the blocking of light that enters through the light entrance surface.

The edge surfaces of the light guide plate may include an adjacent edge surface that is adjacent to the light entrance surface, and the projection may include a contact portion that is in contact with the adjacent edge surface.

According to this configuration, the adjacent edge surface of the light guide plate is in contact with the contact portion and thus the position of the light guide plate is fixed in a direction perpendicular to the adjacent edge surface.

The projection may continue to the upstanding portion.

According to this configuration, rigidity of the projection is increased compared to a configuration in which the projection that projects from the bottom plate portion is spaced from the upstanding portion.

The lighting device may further include a urethane member that is attached on an outer peripheral surface of the projection.

According to this configuration, before the projection strongly hits against the edge surface of the light guide plate, the urethane member absorbs impacts from the hitting. Therefore, the edge surface is not or is less likely to be damaged due to the hit of the projection against the edge surface of the light guide plate.

The lighting device may further includes a reflection member that has reflectivity and is attached on an outer peripheral surface of the projection.

According to this configuration, light rays that travel from the light source and the light guide plate to the projection are reflected by the projection. Therefore, decrease in brightness of light that exits through the light exit surface is not or less likely to be caused due to leak of light.

The lighting device may further includes a light source board including one of plate surfaces on which the light source is mounted and another one of the plate surfaces fixed to the upstanding portion.

The projection is located at the bottom plate portion of the heat dissipation member. Therefore, the projection is less likely to contact the light source board that is fixed to the upstanding portion of the heat dissipation member. Thus, the distance between the light source and the light entrance surface is effectively restricted by the projection.

The technologies described in this specification may be applied to a display device including the above lighting device and a display panel configured to provide display using light from the above-described lighting device. Further, a display device including a liquid crystal panel using liquid crystals as the display panel has novelty and utility.

Furthermore, a television device including the above display device has novelty and utility.

Advantageous Effect of the Invention

According to the technology disclosed herein, variation in size of components is reduced and an optical design is maintained preferable.

BRIEF DESCRIPTION OF THE DRAWINGS

FIG. 14 is a plane cross-sectional view of a backlight device viewed from a light exit surface side of a light guide plate according to a fourth embodiment.

MODE FOR CARRYING OUT THE INVENTION

First Embodiment

A first embodiment will be described with reference to the drawings. A liquid crystal display device (an example of a display device) 10 according to this embodiment will be described. X-axis, Y-axis, and Z-axis are indicated in some drawings. The axes in each drawing correspond to the respective axes in other drawings. The Y-axis direction corresponds to a vertical direction and the X-axis direction corresponds to a horizontal direction. An upper side and a lower side are based on the vertical direction unless otherwise specified.

Figure 1:
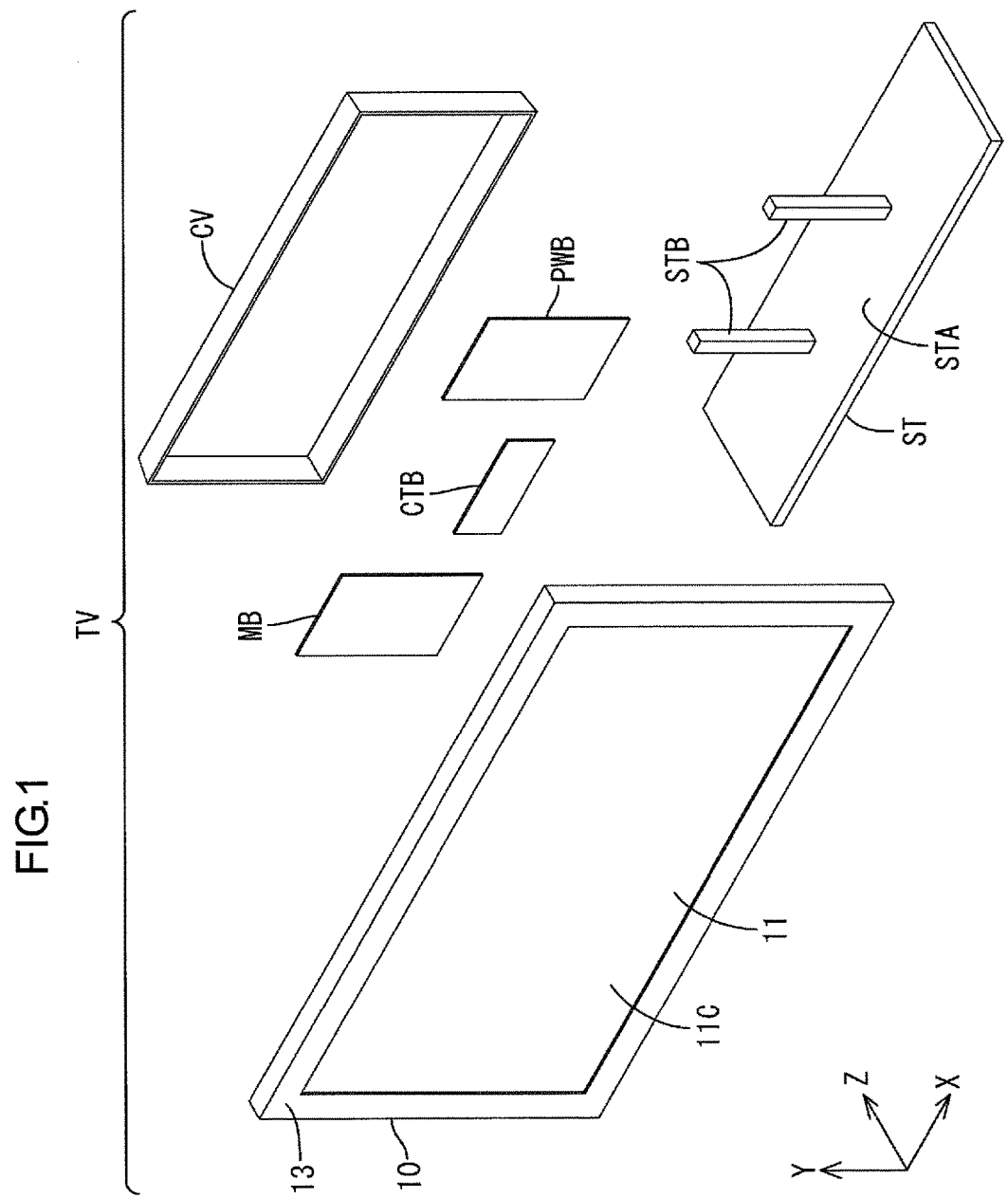
FIG. 1 is an exploded perspective view of a general configuration of a television device according to a first embodiment.
Figure 2:
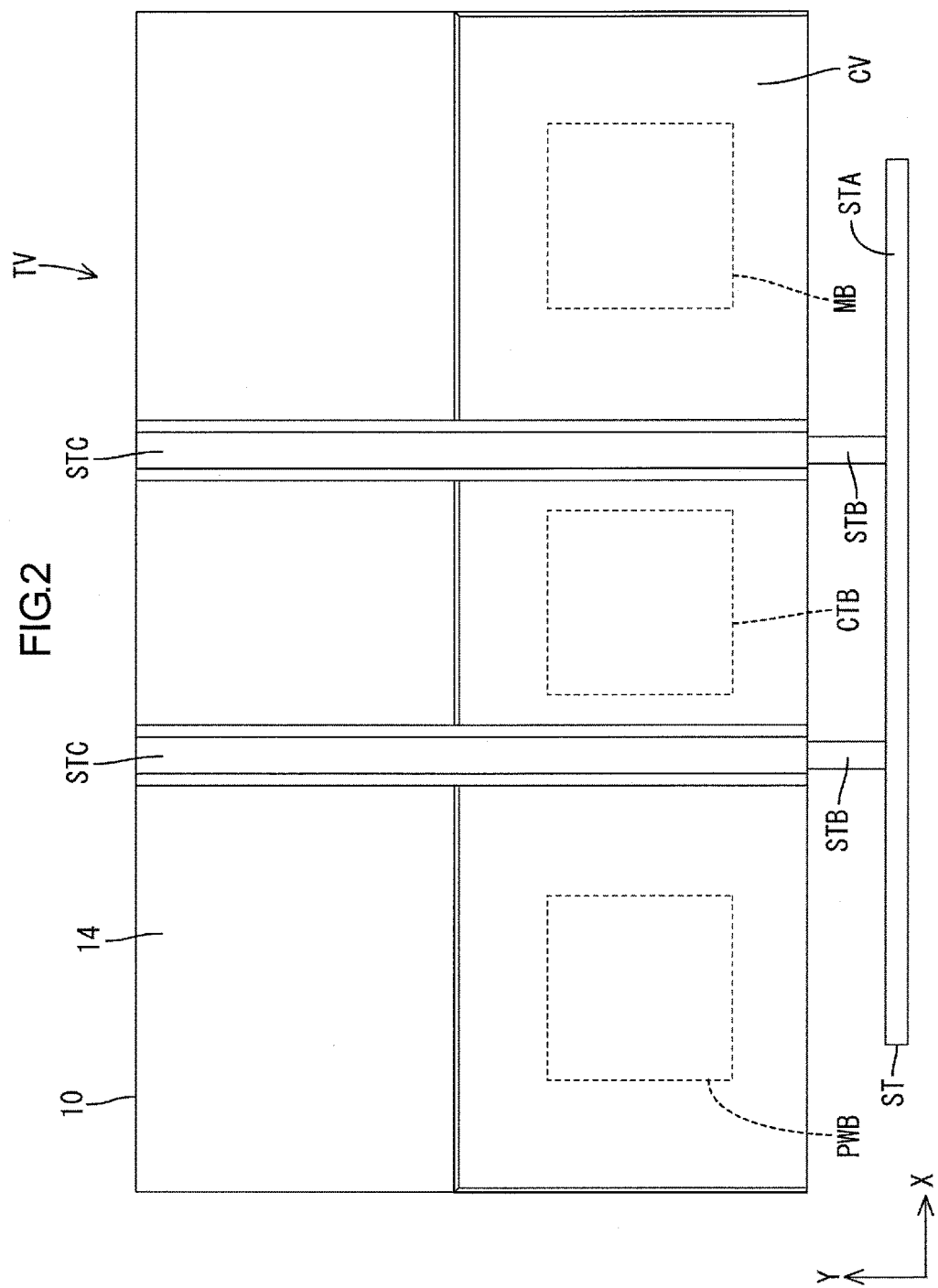
FIG. 2 is a rear view of the television device.

As illustrated in FIG. 1, a television device TV includes a liquid crystal display device 10, boards PWB, MB, and CTB, a cover CV, and a stand ST. The boards PWB, MB, and CTB are attached to a rear surface (a back surface) of the liquid crystal display device 10. The cover CV is attached to the rear surface of the liquid crystal display device 10 so as to cover the boards PWB, MB, and CTB. The stand ST holds the liquid crystal display device 10 such that a display surface of the liquid crystal display device 10 extends in the vertical direction (the Y-axis direction). As illustrated in FIG. 2, the liquid crystal display device 10 has a landscape rectangular overall shape (rectangular and longitudinal). The liquid crystal display device 10 includes a liquid crystal panel 11 as a display panel and a backlight device 12 as an external light source. The liquid crystal panel 11 and the backlight device 12 are collectively held by a frame 13 and a chassis 14. The frame 13 and the chassis 14 are exterior components that provide an external configuration of the liquid crystal display device 10.

Configurations of the rear of the liquid crystal display device 10 will be described. As illustrated in FIG. 2, two stand fitting members STC are attached to a rear surface of the chassis 14 that provides an external configuration of the back of the liquid crystal display device 10. The stand fitting members STC are spaced away from each other in an X-axis direction and extend along the Y-axis direction. Each stand fitting member STC has across section that corresponds to a cross section of a channel beam and opens to the chassis 14. A space is provided between the stand fitting member STC and the chassis 14. Two support portions STB included in the stand ST are inserted in the respective stand fitting members STC. The space provided in the stand fitting member STC is configured to be a path through which wiring members (e.g. electric wires) which are connected to an LED board 18 are passed. The LED board 18 is included in the backlight device 12. The stand ST includes a base STA and the support portions STB. The base STA extends parallel to the X-Z plane. The support portions STB stand on the base STA in the Y-axis direction. The cover CV is made of synthetic resin and attached to a part of the rear surface of the chassis 14. Specifically, as illustrated in FIG. 2, the cover CV covers a lower half part of the chassis 14 so as to cross over the stand fitting members STC in the X-axis direction. A component storage space is provided between the cover CV and the chassis 14. The boards PWB, MB, and CTB, which will be described next, are arranged in the component storage space.

As illustrated in FIG. 2, the liquid crystal display device 10 includes a power source board PWB, a main board MB, and a control board CTB as the boards PWB, MB, and CTB. The power source board PWB will be referred to as a power supply of the liquid crystal display device 10 and configured to supply drive power to the boards MB and CTB and LEDs (an example of a light source) 17 included in the backlight device 12. Namely, the power source board PWB serves as an LED drive board that drives the LEDs 17. The main board MB includes at least a tuner and an image processor, which are not illustrated. The tuner is configured to receive television signals. The image processor performs image processing on the received television signals. The main board MB is configured to output the processed image signals to the control board CTB, which will be described next. If an external image reproducing device, which is not illustrated, is connected to the liquid crystal display device 10, image signals from the image reproducing device are input to the main board MB. The main board MB processes the image signals at the image processor and transmits the processed signals to the control board CTB. The control board CTB is configured to convert the image signals, which is sent from the main board, into driving signals for liquid crystals and to supply the driving signals to the liquid crystal panel 11.

Figure 3:
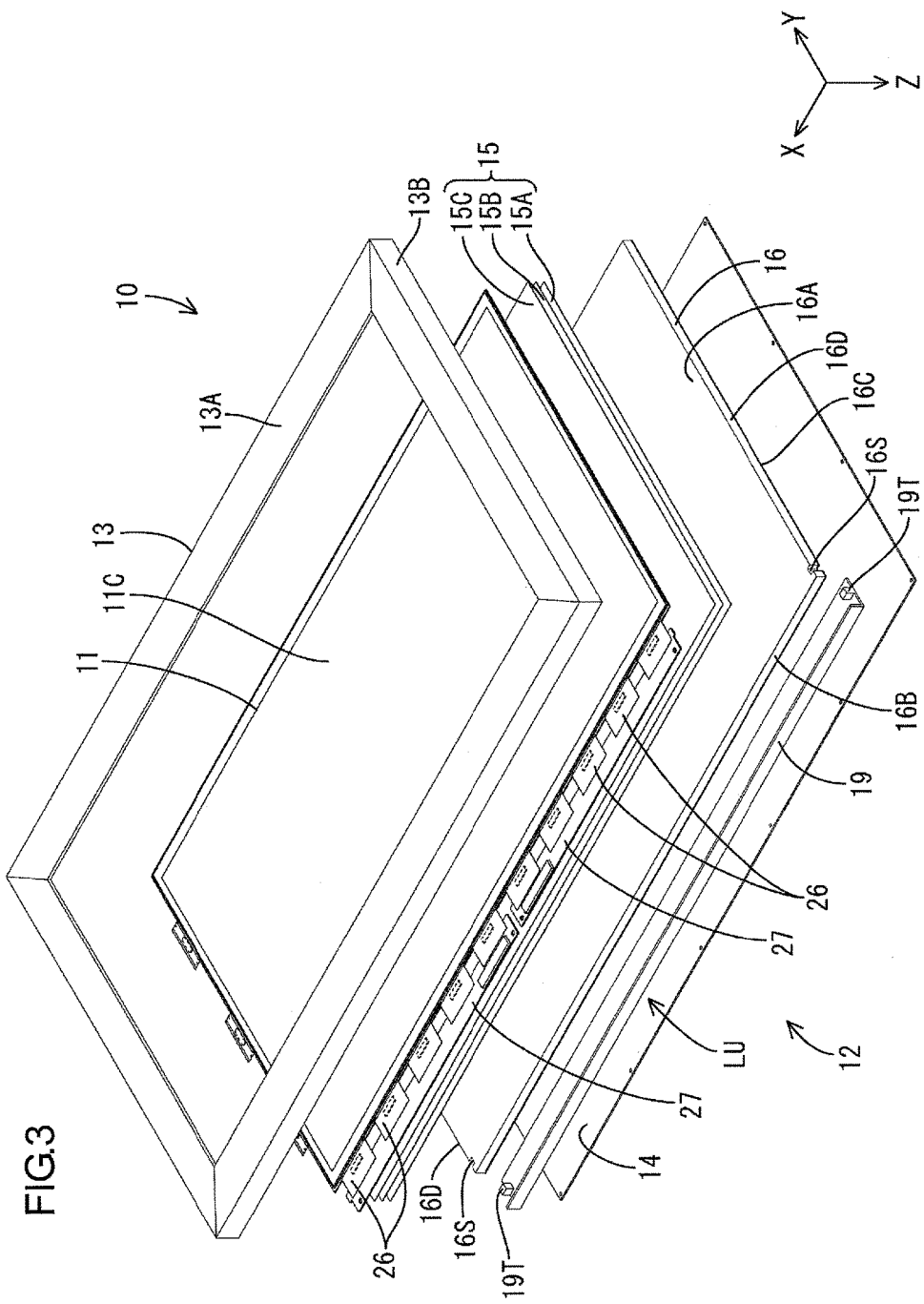
FIG. 3 is an exploded perspective view of a general configuration of a liquid crystal display device.
Figure 4:
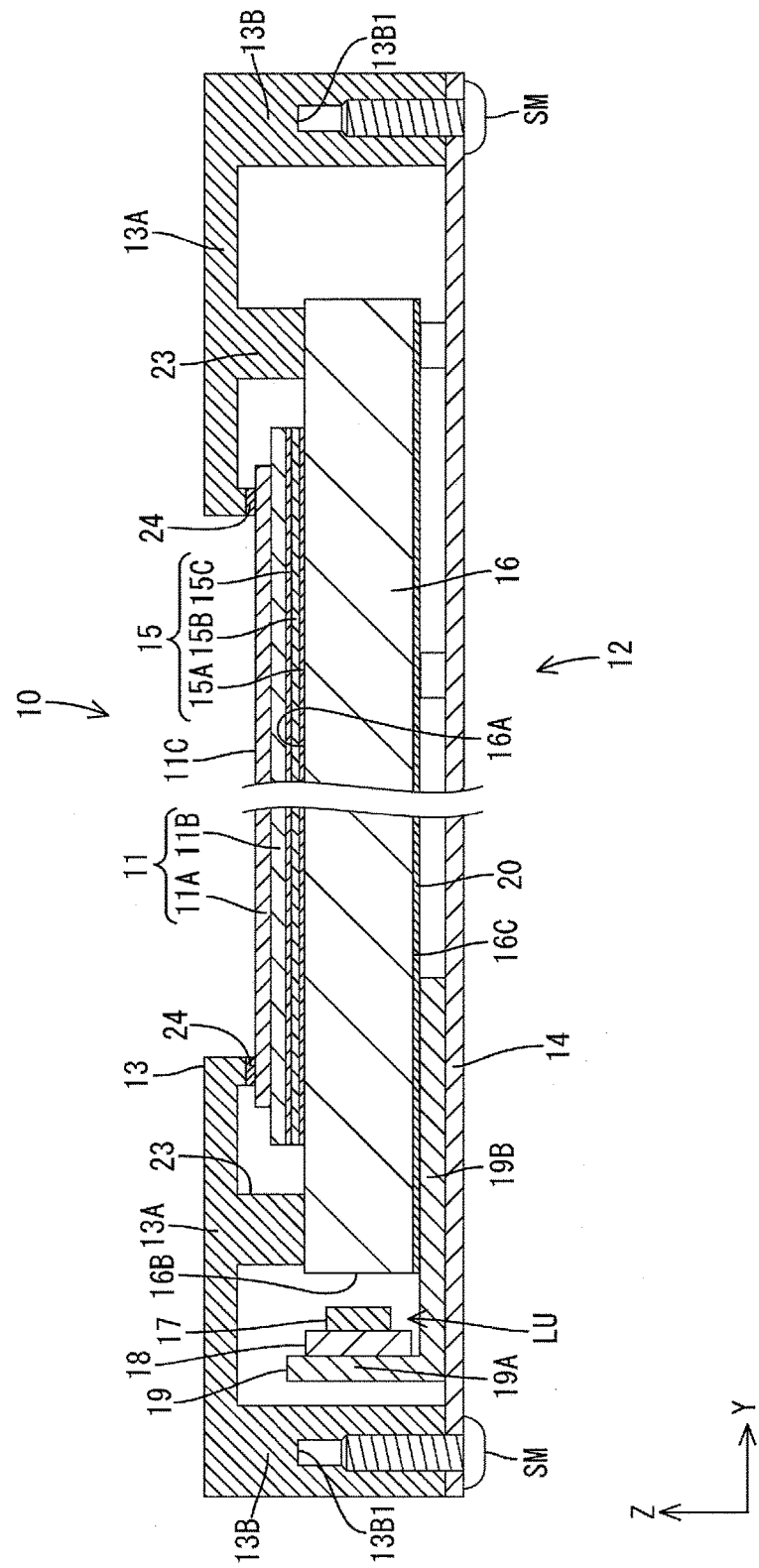
FIG. 4 is a cross-sectional view of the liquid crystal display device taken in a short-side direction thereof.

As illustrated in FIGS. 3 and 4, components of the liquid crystal display device 10 are arranged in a space provided between the frame 13 that is a front exterior member and the chassis 14 that is a rear exterior member. The components arranged between the frame 13 and the chassis 14 are at least the liquid crystal panel 11, an optical member 15, a light guide plate 16, and an LED unit LU. The liquid crystal panel 11, the optical member 15, and the light guide plate 16 are placed on top of one another and held between the frame 13 on the front side and the chassis 14 on the rear side. The backlight device 12 includes the optical member 15, the light guide plate 16, the LED unit LU, and the chassis 14. Namely, the liquid crystal display device 10 without the liquid crystal panel 11 and the frame 13 is the backlight device 12. The LED unit LU is arranged to face one of long-side edge surfaces of the light guide plate 16. Each component will be described next.

As illustrated in FIG. 3, the liquid crystal panel has a landscape rectangular shape (rectangular and longitudinal) in a plan view and includes a pair of glass substrates 11A and 11B (see FIG. 4) and liquid crystals. The substrates 11A and 11B having high light transmissivity are bonded together with a predetermined gap therebetween. The liquid crystals are sealed between the substrates 11A and 11B. On one of the substrates (an array substrate 11B), switching elements (e.g., TFTs), pixel electrodes, and an alignment film are arranged. The switching elements are connected to gate lines and source lines that are arranged perpendicular to each other. The pixel electrodes are connected to the switching elements. On the other one of the substrates (a CF substrate 11A), color filters, counter electrodes, and an alignment film are arranged. The color filters include red (R), green (G), and blue (B) color portions that are arranged in a predetermined arrangement. The liquid crystal panel 11 is placed on a front side of the optical member 15, which will be described later. A rear surface of the liquid crystal panel 11 (an outer surface of a polarizing plate on the rear side) is fitted to the optical member 15 with minimal gaps therebetween. Therefore, dust is less likely to enter between the liquid crystal panel 11 and the optical member 15. The liquid crystal panel 11 includes a display surface 11C having a display area and a non-display area. The display area is an inner area of a screen in which images are displayed. The non-display area is an outer area of the screen around the display area with a frame-like shape. The liquid crystal panel 11 is connected to an unillustrated control board via a driver for driving the liquid crystals and an unillustrated flexible board. The liquid crystal panel 11 displays an image in the display area of the display surface 11C based on signals sent from the control board. The polarizing plates, which are not illustrated, are arranged on outer sides of the respective substrates 11A and 11B.

The frame 13 is made of metal such as aluminum. Therefore, the mechanical strength (rigidity) and thermal conductivity of the frame 13 are higher than those of a frame made of a synthetic resin. As illustrated in FIG. 3, the frame 13 has a landscape-rectangular and frame-like shape that surrounds the display area of the display surface 11C of the liquid crystal panel 11. The frame 13 includes a panel holding portion 13A and sidewall portion 13B. The panel holding portion 13A is parallel to the display surface 11C of the liquid crystal panel 11 and holds down the liquid crystal panel 11 from the front. The sidewall portion 13B protrudes from an outer peripheral portion of the panel holding portion 13A toward the rear. The panel holding portion 13A and the sidewall portion 13B form an L-like cross section. The panel holding portion 13A has a landscape-rectangular and frame-like shape that corresponds to an outer portion of the liquid crystal panel 11. The panel holding portion 13A presses a substantially entire area of the outer portion of the liquid crystal panel 11 from the front. The panel holding portion 13A has a width that is large enough to cover not only the outer portion of the liquid crystal panel 11 but also an outer portion of the optical member 15, an outer portion of the light guide plate 16, and LED unit LU from the front. The outer portion of the optical member 15, and the outer portion of the light guide plate 16, and the LED unit LU are located on the outer side with respect to the outer portion of the liquid crystal panel 11 in a radiation direction. Similar to the display surface 11C of the liquid crystal panel 11, a front exterior surface of the panel holding portion 13A (an opposed surface from a surface facing the liquid crystal panel 11) is seen from the front of the liquid crystal display device 10. The panel holding portion 13A constitutes a front exterior of the liquid crystal display device 10 together with the display surface 11C of the liquid crystal panel 11. As illustrated in FIG. 4, the panel holding portion 13A includes an inner peripheral portion that protrudes rearward, that is, toward the liquid crystal panel 11. A shock absorber 24 is attached to a distal end surface of the inner peripheral portion. The holding protrusion holds down the liquid crystal panel 11 from the front side via the shock absorber 24. The shock absorber 24 has a frame-like shape that extends along the inner peripheral portion of the panel holding portion 13A over the entire length of the inner peripheral portion.

The sidewall portion 13B has a substantially rectangular hollow shape that protrudes from the outer peripheral portion (specifically, an outer peripheral end portion) of the panel holding portion 13A toward the rear. The sidewall portion 13B entirely surrounds the liquid crystal panel 11, the optical member 15, the light guide plate 16, and the LED unit LU, which are arranged in the space between the frame 13 and the chassis 14. The sidewall portion 13B extends along an entire outer peripheral portion of the chassis 14 that is located on the rear side. Outer surfaces of the sidewall portion 13B that extends along an outer peripheral surface of the liquid crystal display device 10 can be seen from the outside of the liquid crystal display device 10. Therefore, the outer surfaces of the sidewall portion 13B constitute a top surface, a bottom surface, and side surfaces of the liquid crystal display device 10. As illustrated in FIG. 4, the sidewall portion 13B includes screw groove 13B1 that opens to the rear side. Screw members SM are fitted in the screw groove 13B1.

The panel holding portion 13A includes contact ribs 23 at an inner position of the panel holding portion 13A with respect to the sidewall portion 13B. The contact ribs 23 are unitary portions of the panel holding portion 13A and support the light guide plate 16 from the front. The contact ribs 23 each protrude from an inner surface of the panel holding portion 13A toward the rear in the Z-axis direction and each have an elongated block-like shape that extends along each side of the panel holding portion 13A. Lengths of the contact ribs 23 that extend along the corresponding sides of the panel holding portion 13A are equal to the lengths of the respective sides of the panel holding portion 13A. According to this configuration, while the contact ribs 23 and the chassis 14 sandwich the light guide plate 16 in between, the contact ribs 23 support the light guide plate 16 from the front (i.e., from the display surface 11C side). That is, the contact ribs 23 have a function to support a light guide plate. The light guide plate 16 is pressed by the contact ribs 23 from the front along an entire length of an outer portion of the light guide plate 16.

Similar to the frame 13, the chassis 14 is made of metal such as aluminum and thus the mechanical strength (rigidity) and thermal conductivity of the chassis 14 are higher than those of a chassis made of synthetic resin. As illustrated in FIG. 3, the chassis 14 has a substantially flat and longitudinal plate-like shape as a whole similar to the light guide plate 16, which will be described later. The chassis 14 covers overall areas of the light guide plate 16 and the LED unit LU from the rear side. A front surface of the chassis 14 faces an opposed surface 16C of the light guide plate 16 and the LED unit LU, each of which will be described later. A rear surface of the chassis 14 is seen from the rear side and constitutes a back surface of the liquid crystal display device 10. The chassis 14 includes multiple screw through holes (not illustrated) along the outer peripheral portion. The screw members SM are inserted in the respective screw through holes. The chassis 14 is arranged such that the outer peripheral portion is in contact with the sidewall portion of the frame 13 and such that the screw through holes are communicated with the screw groove 13B1 of the sidewall portion. The screw members SM are fastened and thus the frame 13 and the chassis 14 are fixed to each other. As illustrated in FIG. 3, the frame 13 and the chassis 14 hold the LED unit LU in a space between edge portions of the frame 13 and the chassis 14 on one side with respect to short dimensions thereof (i.e., long-side edges on one side). Further, the frame 13 and the chassis 14 hold the liquid crystal panel 11, the optical member 15, and the light guide plate 16, which are placed on top of the other, from the front side and the rear side.

As illustrated in FIG. 3, the optical member 15 has a landscape rectangular shape in a plan view similar to the liquid crystal panel 11 and has about the same size (a short dimension and a long dimension) as the liquid crystal panel 11. The optical member 15 is placed on a front surface (a light exit surface) of the light guide plate 16, which will be described later, and sandwiched between the liquid crystal panel 11 and the light guide plate 16. The optical member 18 includes three sheets that are placed on top of one another. The three sheets of the optical member 15 are a diffuser sheet 15A, a lens sheet 15B, and a reflecting type polarizing sheet 15C from the light guide plate 16 side (the rear side). Each of the sheets has about the same size in a plan view.

The light guide plate 16 is made of a substantially transparent (high light transmissivity) synthetic resin (e.g., acrylic resin or polycarbonate such as PMMA) which has a refractive index considerably higher than that of the air. As illustrated in FIG. 3, the light guide plate 16 has a landscape rectangular shape in a plan view similar to the liquid crystal panel 11 and the optical member 15. A thickness of the light guide plate 16 is larger than a thickness of the optical member 15. A long-side direction and a short-side direction of a plate surface of the light guide plate 16 correspond to the X-axis direction and the Y-axis direction, respectively. A thickness direction of the light guide plate 16 that is perpendicular to the plate surface corresponds to the Z-axis direction. The light guide plate 16 is arranged on the rear side of the optical member 15 and sandwiched between the optical member 15 and the chassis 14. As illustrated in FIG. 4, at least a short dimension of the light guide plate 16 is larger than those of the liquid crystal panel 11 and the optical member 15. The light guide plate 16 is arranged such that edges of the short dimension thereof (i.e., edges along the long-side direction of the light guide plate 16) are located outward with respect to corresponding edges of the liquid crystal panel 11 and the optical member 15 (i.e., not overlap in a plan view). One of long-side edge surfaces of the light guide plate 16 is a light entrance surface 16B through which light that exits the LEDs 17 enters the light guide plate 16. The LEDs 17 will be described later.

One of plate surfaces of the light guide plate 16 facing the front side (a surface facing the optical member 15) is a light exit surface 16A through which light in the light guide plate 16 exits toward the optical member 15 and the liquid crystal panel 11. A rear surface of the light guide plate 16, that is, a plate surface opposite from the light exit surface 16A, is the opposed surface (a surface facing the chassis 14) 16C. As illustrated in FIG. 4, a reflection sheet 20, which will be described later, is arranged to cover an entire area of the opposed surface 16C. A direction in which the light guide plate 16 and the LEDs 17 are arranged corresponds to the Y-axis direction, and a direction in which the light guide plate 16, the optical member 15, and the reflection sheet 20 are arranged corresponds to the Z-axis direction. The light guide plate 16 is configured to receive light emitted from the LED unit LU through the light entering surface 16B, transmit the light therethrough, and direct the light toward the optical member 15 (toward the front side, the light exit side). Light exits the light guide plate 16 through the light exit surface 16A.

The light guide plate 16 includes short-side edge surfaces that are adjacent to the light entrance surface 16B (see FIGS. 3 and 5) and defined as adjacent edge surfaces 16D. Each of the adjacent edge surfaces 16D of the light guide plate 16 includes a cut portion 16S that is recessed toward the center of the light guide plate 16. As illustrated in FIG. 6, each of the cut portions 16S is located at a position of the corresponding adjacent edge surface 16D close to the light entrance surface 16B. The cut portion 16S has a rectangular shape in a plan view and is through the light guide plate 16 in the thickness direction (Z-axis direction) of the light guide plate 16. The positions of the cut portions 16S with respect to the short-side direction of the light guide plate 16 (with respect to the Y-axis direction) are the same.

The reflection sheet 20 is a rectangular sheet made of synthetic resin and includes a white surface having a high light reflectivity. A long-side direction of the reflection sheet 20 corresponds to the X-axis direction and a short-side direction of the reflection sheet 20 corresponds to the Y-axis direction. The reflection sheet 20 is slightly apart from the chassis 14. A front surface of the reflection sheet 20 is a reflecting surface that is in contact with the opposed surface 16C of the light guide plate 16. With this configuration, some of light rays that exit the LED unit LU and are directed toward the reflecting surface 16C through the light guide plate 16 are reflected by the reflecting surface. A short dimension of the reflection sheet 20 is about the same as the short dimension of the light guide plate 16.

Next, a configuration of each of the LEDs 17, the LED board 18, and a heat dissipation member 19 included in the LED unit LU will be described. Each LED 17 of the LED unit LU includes an LED chip (not illustrated). The LED chip is disposed on aboard that is fixed to the LED board 18 and sealed with resin. The LED chip on the board has one main light emission wavelength. Specifically, the LED chip that emits light in a single color of blue is used. The resin that seals the LED chip contains phosphors dispersed therein. The phosphors emit light in a predetermined color when excited by blue light emitted from the LED chip. Thus, overall color of light emitted from the LED 17 is white. The phosphors may be selected, as appropriate, from yellow phosphors that emit yellow light, green phosphors that emit green light, and red phosphors that emit red light. The phosphors may be used in combination of the above phosphors. The LED 17 includes a light-emitting surface that is a surface opposite from a surface fixed to the LED board 18. Namely, the LED 17 is a so-called top-surface-emitting type LED. The LEDs 17 are arranged such that the respective light emitting surfaces are opposite the light entrance surface 16B of the light guide plate 16.

As illustrated in FIGS. 3 and 6, the LED board 18 of the LED unit LU has an elongated plate-like shape and extends in the long-side direction of the light guide plate 16 (the X-axis direction). The LED board 18 is arranged in a space between the frame 13 and the chassis 14 such that a plate surface of the LED board 18 is parallel to the X-Z plane, that is, parallel to the light entrance surface 16B of the light guide plate 16. A long-side dimension (the X-axis direction) of the LED board 18 is slightly smaller than the long-side dimension of the light guide plate 16 (see FIG. 6). A plate surface of the LED board 18 on the inner side, that is, a plate surface facing the light guide plate 16 is a mount surface, and the LEDs 17 are arranged on the mount surface at intervals in a line (i.e., linearly) along the long-side direction of the LED board 18 (the X-axis direction). In other words, the LEDs 17 are arranged apart from each other along one of long-side ends of the backlight device 12. Distances between the adjacent LEDs 17 in the X-axis direction are substantially equal, that is, the LEDs 17 are arranged at substantially equal intervals. An arrangement direction of the LEDs 17 corresponds to the longitudinal direction of the LED board 18 (the X-axis direction). A Metal-film trace (not illustrated), such as copper-foil trace, is formed on the mount surface of the LED board 18. The metal-film trace extends in the X-axis direction and crosses over a group of the LEDs 17 so as to connect the adjacent LEDs 17 in series. Terminals at ends of the trace are electrically connected to the power source board PWB via wiring members including conneters and electric wires. Thus, drive power is supplied to the LEDs 17.

The heat dissipation member 19 included in the LED unit LU is made of metal having high thermal conductivity, such as aluminum. As illustrated in FIG. 4, the heat dissipation member 19 includes an upstanding portion 19A and a bottom plate portion 19B. The LED board 18 is fixed to the upstanding portion 19A. The bottom plate portion 19B is in surface-contact with a plate surface of the chassis 14. The upstanding portion 19A and the bottom plate portion 19B form an angle therebetween so as to have an L-like cross section. The upstanding portion 19A extends perpendicular to the bottom plate portion 19B (i.e., in the Z-axis direction) from an outer edge of the bottom plate portion 19B toward the front. The upstanding portion 19A has a plate-like shape parallel to the plate surface of the LED board 18 and the light entrance surface 16B of the light guide plate 16. A long side direction, a short-side direction, and a thickness direction of the upstanding portion 19A correspond to the X-axis direction, the Z-axis direction, and the Y-axis direction, respectively. The LED board 18 is mounted on an inner surface of the upstanding portion 19A, that is, a plate surface that faces the light guide plate 16. A long dimension of the upstanding portion 19A is larger than a long dimension of the light guide plate 16. A short dimension of the upstanding portion 19A is larger than short dimensions of the light guide plate 16 and the LED board 18.

As illustrated in FIG. 4, the bottom plate portion 19B of the heat dissipation member 19 has a plate-like shape that is parallel to the plate surface of the chassis 14. A long-side direction, a short-side direction, and a thickness direction of the bottom plate portion 19B correspond to the X-axis direction, the Y-axis direction, and the Z-axis direction, respectively. The bottom plate portion 19B extends from a rear edge of the upstanding portion 19A (an edge close to the chassis 14) toward an inner side in the Y-axis direction, that is, toward the center of the light guide plate 16. A large portion of the bottom plate portion 19B is located on the rear side of the light guide plate 16 and on the rear side of the reflection sheet 20. That is, the large portion of the bottom plate portion 19B is sandwiched (or located) between the reflection sheet 20 and the chassis 14. A long dimension of the bottom plate portion 19B is about the same as the long dimension of the upstanding portion 19A and larger than the long dimension of the light guide plate 16. An entire area of a rear surface of the bottom plate portion 19B, that is, an entire area of a plate surface of the bottom plate portion 19B facing the chassis 14, is in surface-contact with the chassis 14. With this configuration, heat that is transferred from the LEDs 17 to the heat dissipation member 19 is effectively dissipated from the bottom plate portion 19B toward the chassis 14.

Figure 5:
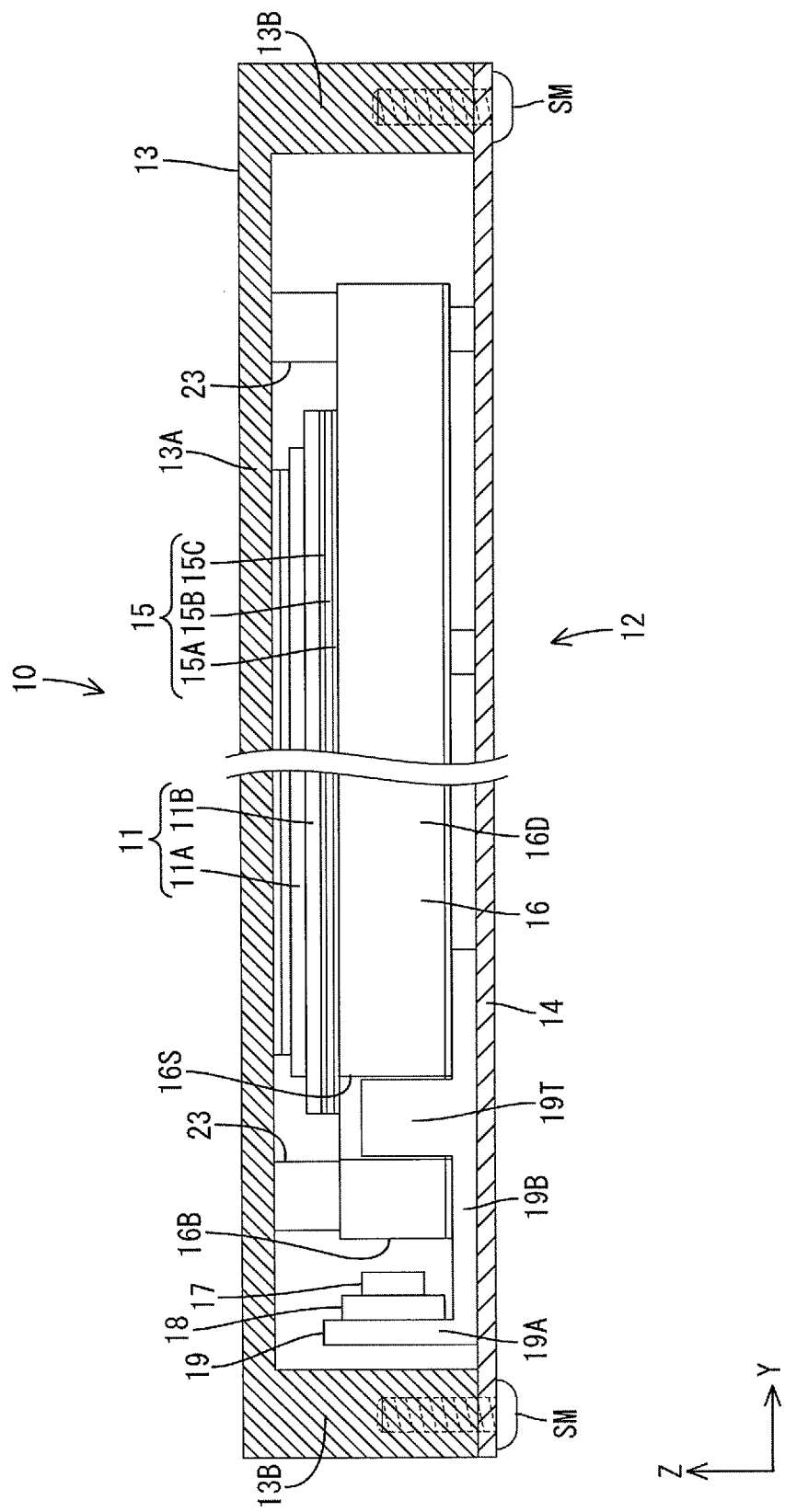
FIG. 5 is a side cross-sectional side view of the liquid crystal display device viewed from an adjacent edge surface side of a light guide plate.
Figure 6:
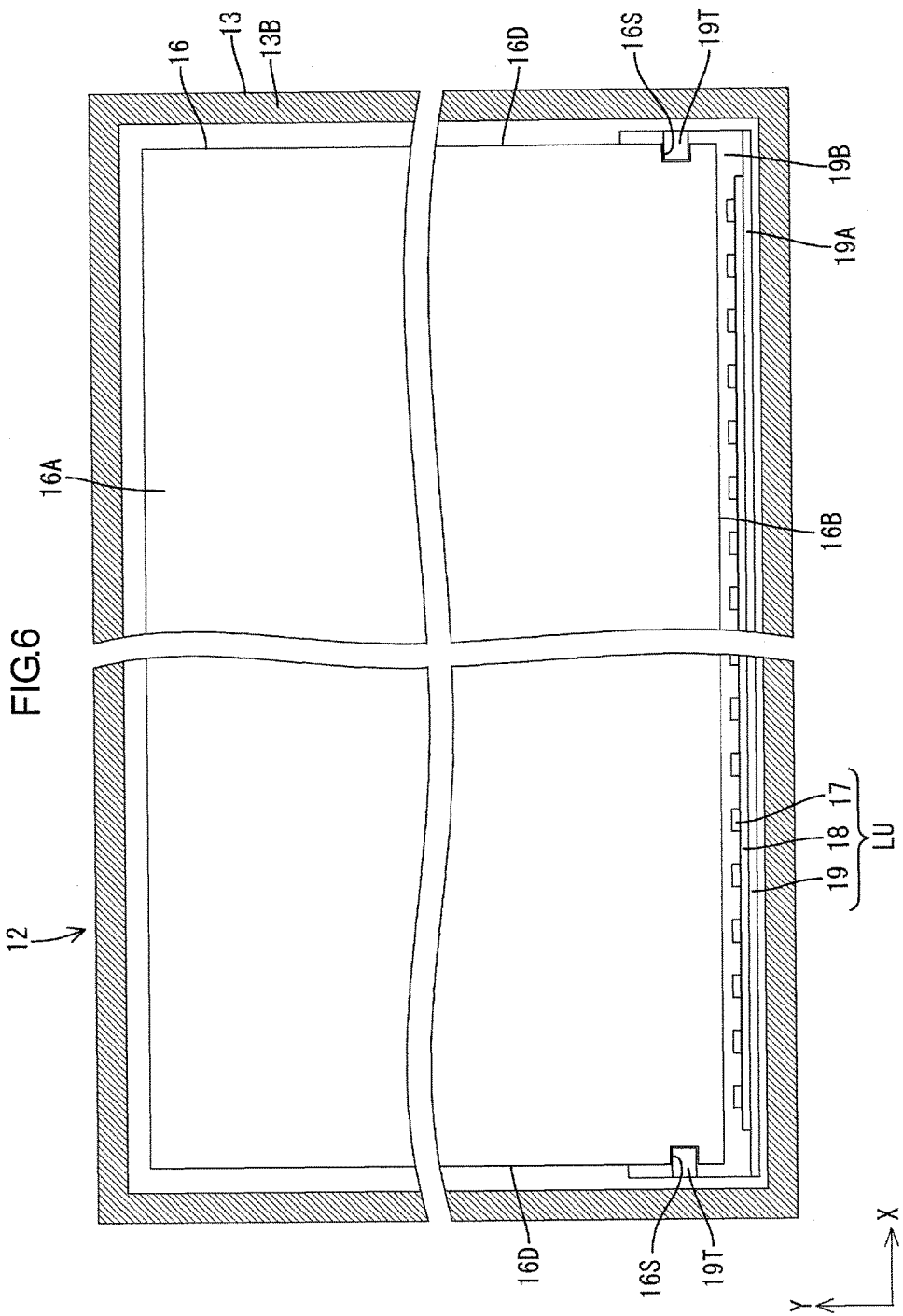
FIG. 6 is a plane cross-sectional view of a backlight device viewed from a light exit surface side of the light guide plate.
Figure 8:
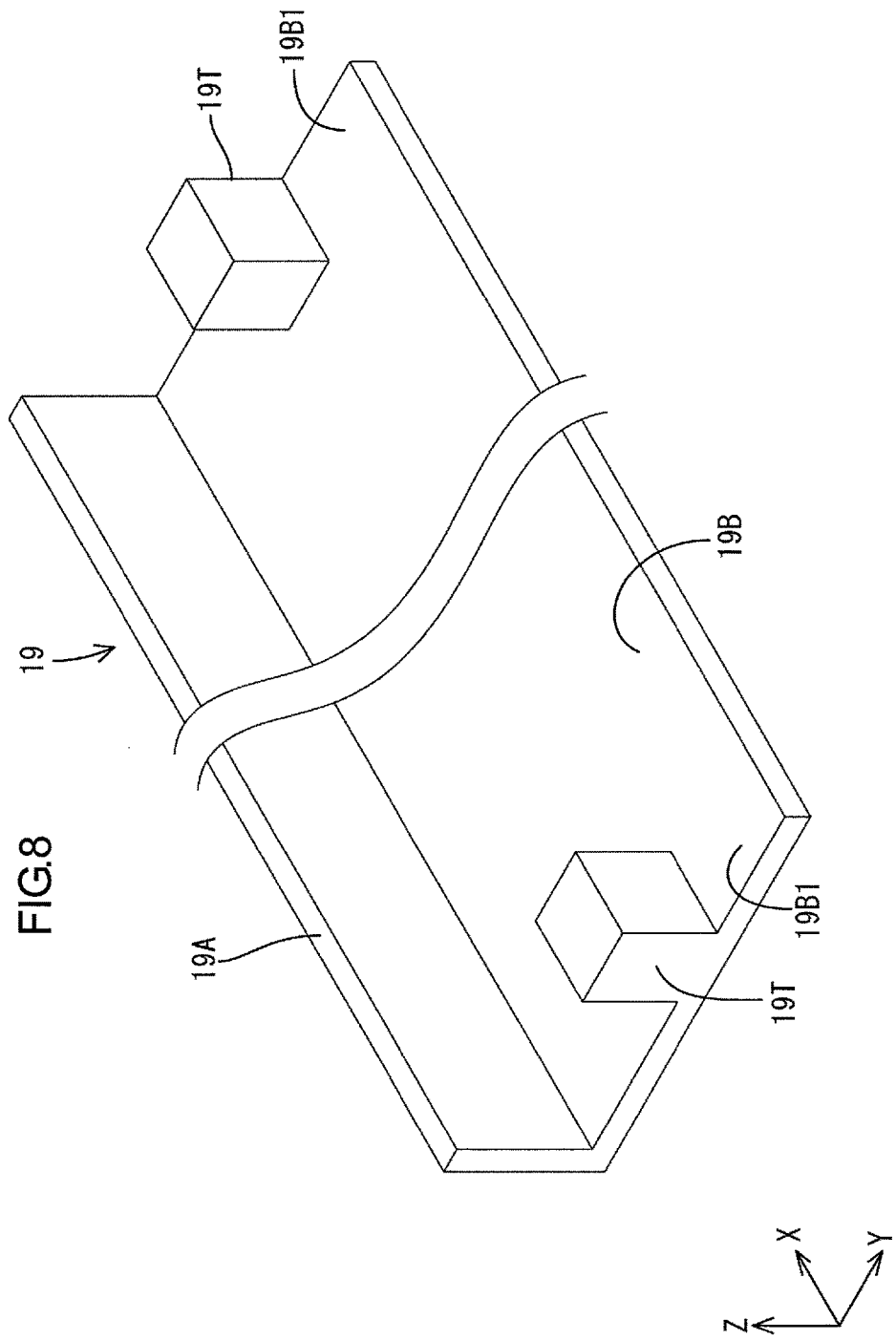
FIG. 8 is a magnified perspective view of a heat dissipation member.

As illustrated in FIGS. 3, 5, and 6, the bottom plate portion 19B includes projections 19T at two edges of the long dimension of the bottom plate portion 19B, respectively and the projections 19T project toward the light exit surface 16A (i.e. toward the front side). The projections 19T are symmetrical to each other with the light guide plate 16 in between. Each projection 19T has a block-like shape (see FIG. 8) and projects perpendicular to the bottom plate portion 19B (in the Z-axis direction). As illustrated in the plan view of FIG. 6, a half portion of the projection 19T is in the corresponding cut portion 16S with little gap between the projection 19T and side surfaces of the cut portion 16S. That is, the projections 19T are fitted in the respective cut portions 16S and thus the light guide plate 16 and the heat dissipation member 19 are connected to each other with the projections 19T. In the configuration that the projection 19T is fitted in the cut portion 16S, the projection 19T and the side surfaces of the corresponding cut portion 16S are close to each other or in contact with each other with respect to directions along the plate surface of the light guide plate 16 (the X-Y plane). Thus, the position of the light guide plate 16 with respect to the directions along its plate surface is fixed. As a result, a distance between the LEDs 17 and the light entrance surface 16B of the light guide plate 16 is restricted.

In this embodiment, the projections 19T and the cut portions 16S are fitted to each other. Therefore, when the light guide plate 16 thermally expands and the position of the light entrance surface 16B of the light guide plate 16 is changed in a direction perpendicular to the light entrance surface 16B (i.e., in the Y-axis direction), the position of the projections 19T is changed according to the change of the position of the light entrance surface 16B. That is, the heat dissipation member 19, and the LEDs 17 that are held by the heat dissipation member 19 with the LED board 18 in between also move according to the change of the position of the light entrance surface 16B. With this configuration, even when the light guide plate 16 thermally expands, the distance between the LEDs 17 and the light entrance surface 16B is maintained and thus an optical design remains preferable. Further, in this embodiment, the distance between the LEDs 17 and the light entrance surface 16B is maintained constant by the projections 19T that are portions of the existing heat dissipation member 19. That is, an additional component such as a spacer is not necessary. Compared to a configuration that includes a separate component such as a spacer, variation in size of components and variation in manufacturing can be reduced, and thus the distance between the LEDs 17 and the light entrance surface 16B is maintained constant with high accuracy.

The reflection sheet 20 includes reflection sheet cut portions (not illustrated) at positions corresponding to the respective cut portions 16S of the light guide plate 16 in a plan view. The reflection sheet cut portions are similar to the cut portions 16S in shape and size. The projections 19T that are fitted in the respective cut portions 16S of the light guide plate 16 are also fitted in the respective reflection sheet cut portions. Accordingly, the position of the reflection sheet 20 with respect to directions along its sheet surface (i.e. in the X-Y plane) is fixed. According to this configuration, the distance between the LEDs 17 and the reflection sheet 20 is maintained constant and thus light rays that are directed toward the reflection sheet 20 are effectively reflected by the reflection sheet 20. Therefore, brightness is not decreased or is less likely to be decreased and light rays do not or are less likely to leak.

Figure 7:
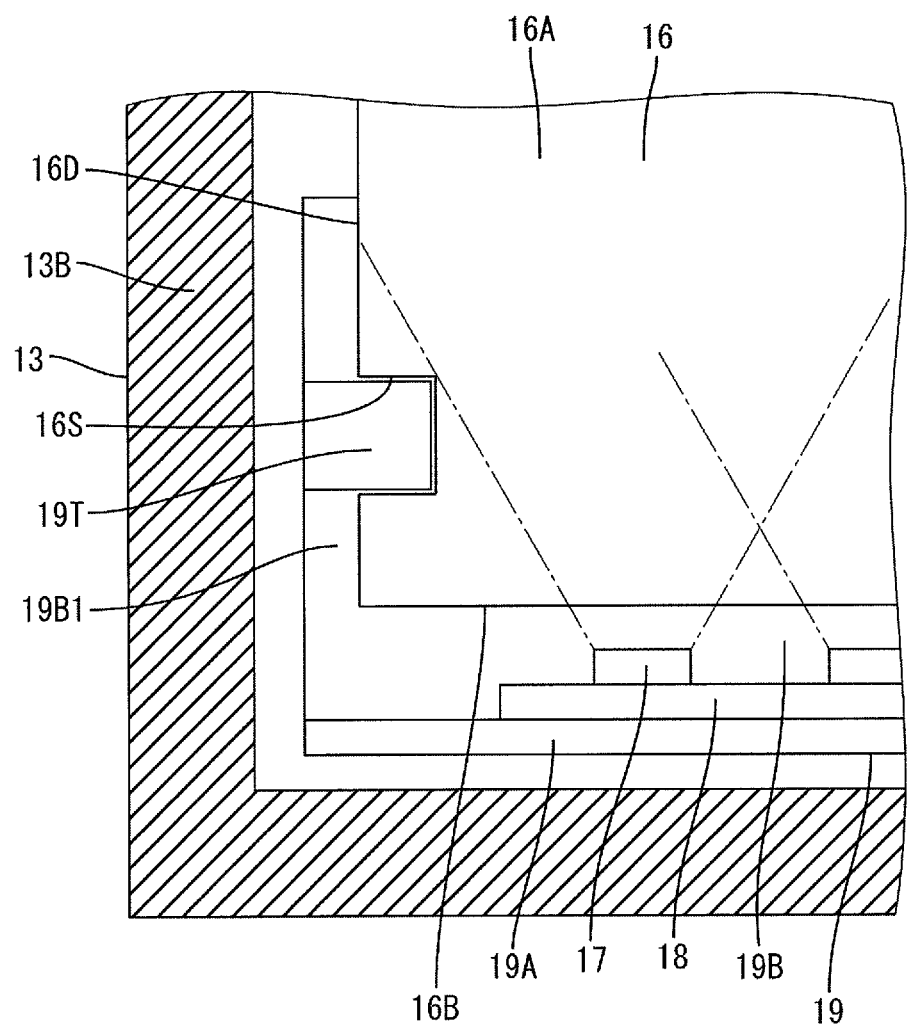
FIG. 7 is a magnified plane cross-sectional view of one of projections and its vicinity in FIG. 6.

As illustrated in FIG. 7, each cut portion 16S is located at a portion of the light guide plate 16 not overlapping a distribution of light rays from the LED 17 through the light entrance surface 16B (refer to chain lines in FIG. 7). That is, the projections 19T of the heat dissipation member 19 fitted in the corresponding cut portions 16S do not block the light from the LEDs 17. Therefore, brightness unevenness caused by blocking of the light is less likely to be caused in light rays that exit the light guide plate 16 through the light exit surface 16A.

During the manufacturing process of the backlight device 12, the position of the light guide plate 16 with respect to the directions along the plate surface (i.e., the X-Y plane) can be fixed by fitting the projections 19T of the heat dissipation member 19 into the respective cut portions 16S of the light guide plate 16 when mounting the light guide plate 16 and the heat dissipation member 19, as described above. Therefore, workability in the manufacturing process is increased. Further, as described above, since the backlight device 12 does not necessarily include an additional component such as a spacer, the manufacturing process of the backlight device 12 is simplified compared to a configuration that includes such a component.

As is described above, in the backlight device 12 according to this embodiment, the distance between the LEDs 17 and the light entrance surface 16B of the light guide plate 16 is restricted by stopping the projections 19T of the heat dissipation member 19 at the respective adjacent edge surfaces 16D of the light guide plate 16. Therefore, even when the light guide plate 16 thermally expands, the distance between the LEDs 17 and the light entrance surface 16B is less likely to change and thus an optical design remains preferable. Further, the projections 19T are portions of the existing heat dissipation member 19, and this configuration does not require additional components to restrict the distance between the LEDs 17 and the light entrance surface 16B. Accordingly, variation in size and variation in manufacturing that may be caused by such additional components are reduced. That is, in the backlight device 12 according to this embodiment, the variation in size of components is reduced and an optical design is maintained preferable.

In this embodiment, the light guide plat 16 includes the cut portions 16S not overlapping the light distribution range of light rays that enter the light guide plate 16 through the light entrance surface 16B. According to this configuration, the light rays that enter the light guide plate through the light entrance surface 16B are less likely to be blocked by the projections 16T that are fitted in the respective cut portions 16S. Therefore, uneven brightness that is resulted from the blocking of the light rays is less likely to occur in the light exit surface 16A.

The backlight device 12 according to this embodiment includes the light source board that includes one of the plate surfaces on which the LEDs are mounted and another one of the plate surface fixed to the upstanding portion of the heat dissipation member. According to this configuration, the projections 19T that are at the bottom plate portion 19B of the heat dissipation member 19 are less likely to contact the LED board 18 that is fixed to the upstanding portion 19A of the heat dissipation member 19. Therefore, the distance between the LEDs 17 and the light entrance surface 16B is effectively restricted by the projections 19T.

In this embodiment, the heat dissipation member 19 includes the projections 19T. In comparison to a configuration without the projections 19T, a surface area of the heat dissipation member 19 increases. Thus, heat dissipation properties of the heat dissipation member 19 further increases.

In view of the manufacturing process of the backlight device, it is considered that surface processing of the front and rear plate surfaces of the light guide plate is extremely difficult but edge processing of the edge surfaces of the light guide plate is easier. The light guide plate 16 of this embodiment includes the cut portions 16S at the edge surfaces. Therefore, compared to a light guide plate 16 that includes recessed portions in the front or rear surface, the manufacturing process can be simplified.

If the cut portions 16S are formed in portions of the light entrance surface 16B, the cut portions 16S may cause loss in light that enters the light guide plate 16 through the light entrance surface 16B. The cut portions 16S of this embodiment are located in the adjacent edge surfaces that are adjacent to the light entrance surface 16B. Thus, such a loss is less likely to be caused.

<First Modification of First Embodiment>

A first modification of the first embodiment will be described. In this modification, urethane members (not illustrated) are attached to peripheral surfaces of the respective projections 19T. According to this configuration, the urethane members absorb impacts if the projections 19T strongly come into contact with the respective cut portions 16S of the light guide plate 16. Therefore, the cut portions 16S are not or less likely to be damaged by the strong contact of the projections 19T and the cut portions 16S of the light guide plate 16. Further, the urethane member fills in a gap between the projection 19T and the cut portion 16S. Thus, even if variation in size exists in each projection 19T, such variation is less likely to adversely affect the device.

<Second Modification of First Embodiment>

A second modification of the first embodiment will be described. In this modification, reflection members (not illustrated) having reflectivity are attached to the outer peripheral surfaces of the respective projections 19T. According to this configuration, light rays that travel from the LEDs 17 or the light guide plate 16 to the projections 19T are reflected by the projections 19T. Therefore, brightness of light that exits the light guide plate 16 through the light exit surface 16A is not or is less likely to decrease due to leak of light. That is, light use efficiency is increased. In the backlight device 12 according to this embodiment, any members may be attached to the projections 19T, namely, the backlight device 12 has high design flexibility.

Second Embodiment

Figure 9:
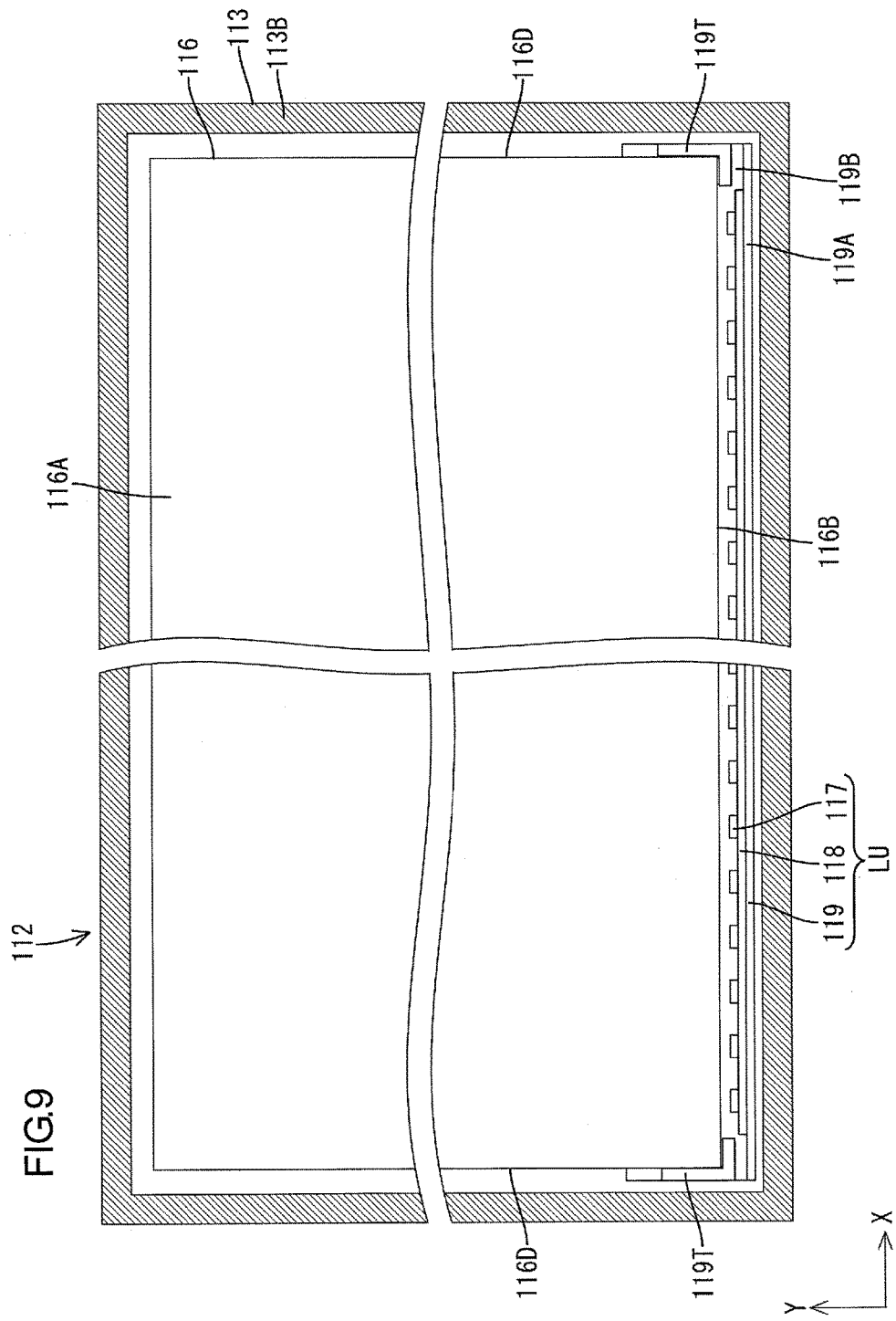
FIG. 9 is a plane cross-sectional view of a backlight device viewed from a light exit surface side of a light guide plate according to a second embodiment.
Figure 10:
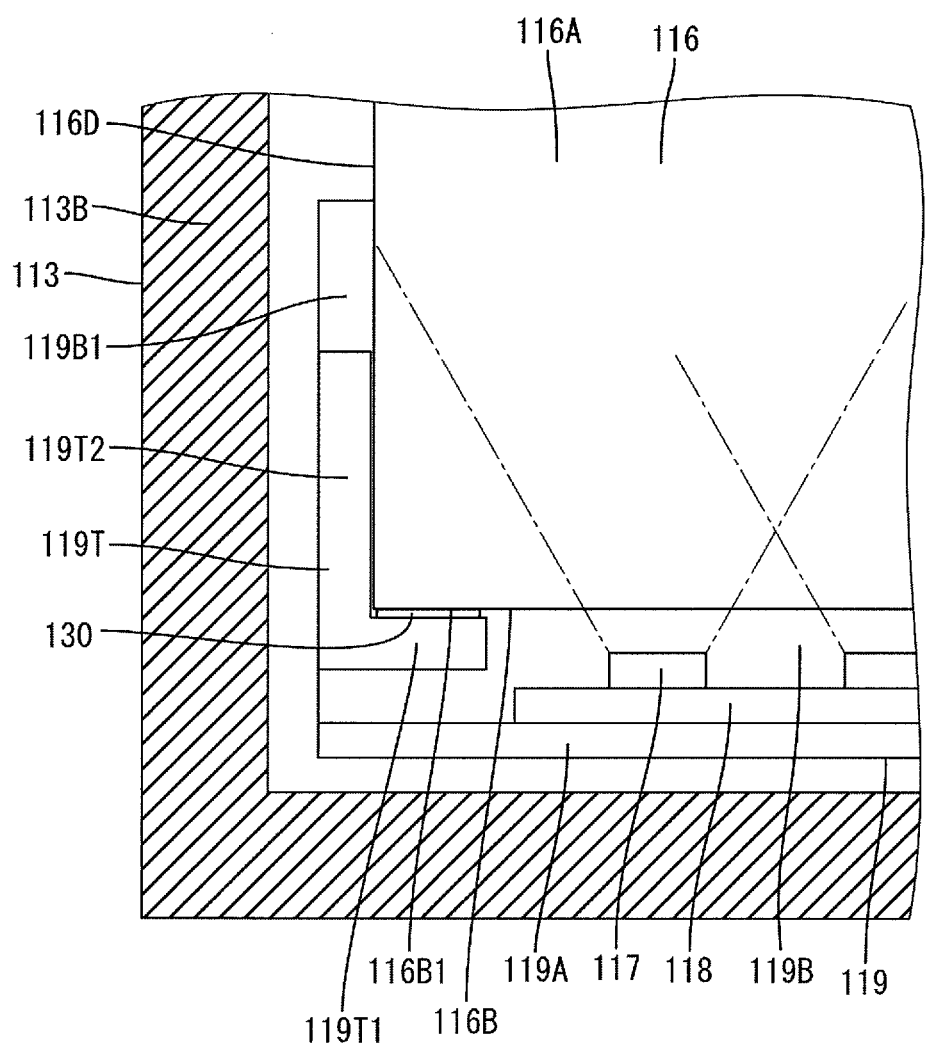
FIG. 10 is a magnified plane cross-sectional view of one of projections and its vicinity in FIG. 9.
Figure 11:
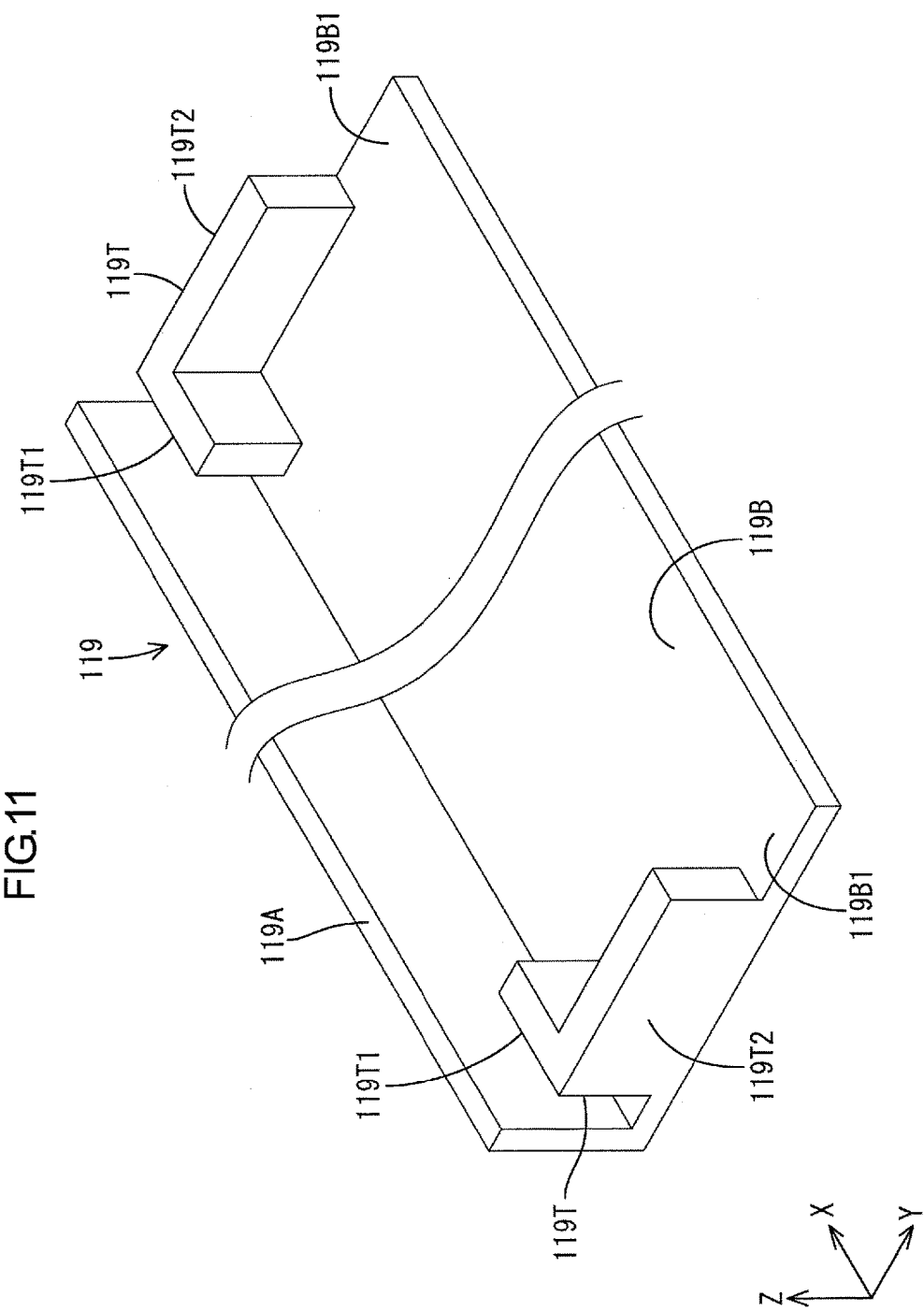
FIG. 11 is a magnified perspective view of a heat dissipation member according to a second embodiment.

A second embodiment will be described with reference to drawings. According to the second embodiment, the projections 119T are different in shape from those in the first embodiment. Other configurations are same as those in the first embodiment and therefore, the constructions, functions, and effects similar to those of the first embodiment will not be described. In FIGS. 9, 10, and 11, portions represented by numerals that are equal to the numerals in FIGS. 6, 7, and 8 with 100 added thereto have the same configurations as the portions represented by the respective numerals in the first embodiment.

As illustrated in FIG. 9, in a backlight device 112 according to the second embodiment, a bottom plate portion 119B of the heat dissipation member 19 includes the projections 119T that project from portions thereof, that is, from end portions of a long dimension of the bottom plate portion 119B (in the X-axis direction) toward a light exit surface 116A (toward the front side), similar to the first embodiment. Each of the projections 119T has a block like shape. As illustrated in FIG. 10, the projection 119T includes an attaching portion 119T1 and a contact portion 119T2 that form a substantially L-like shape in a plan view. The attaching portion 119T1 is opposite an end of the light entrance surface 116B with respect to its long-side direction (the X-axis direction) and attached to a portion of the light entrance surface 116B opposite thereto with an adhesive tape 130. That is, the projections 19T are connected to the light entrance surface 116B of the light guide plate 16, which is one of edge surfaces of the light guide plate 16, and thus the distance between LEDs 117 and the light entrance surface 116B is maintained constant. As illustrated in FIG. 10, the portion of the light entrance surface 116B to which the attaching portion 119T1 is attached with the adhesive tape 130 in between does not overlap a light distribution range of light rays from the LEDs 117 through the light entrance surface 116B (see chain lines in FIG. 10).

As illustrated in FIGS. 9 and 10, the contact portions 119T2 of the projections 119T continue to the respective attaching portions 119T1 and are at corresponding adjacent edge surfaces 116D of the light guide plate 116 close to the light entrance surface 116B. The contact portion 119T2 extends along the adjacent edge surface 116D and is in contact with the adjacent edge surface 116D. With the adjacent edge surfaces 116D of the light guide plate 116 being in contact with the contact portions 119T2 of the respective projections 119T, the position of the light guide plate 116 with respect to a direction perpendicular to the adjacent edge surface 116D of the light guide plate 116 (i.e., the Y-axis direction) is fixed.

As is described above, the projections 119T of this embodiment each include the attaching portion 119T1 that is attached to the light entrance surface 116B. With this configuration, the distance between the LEDs 117 and the light entrance surface 116B can be restricted by the projections 119T without forming cut portions 116S in the light guide plate 116. That is, since it is not necessary to process the light guide plate 116, the manufacturing process of the backlight device 112 can be simplified. Further, each attaching portion 119T1 is attached to a portion of the light entrance surface 116B not overlapping a light distribution range of light rays emitted by the LEDs 117 and entering the light guide plate 116 through the light entrance surface 116B. Thus, the light rays entering through the light entrance surface 116B are not blocked by the attaching portions 119T1. Accordingly, brightness of light that exits through the light exit surface 116A is less likely to be lowered by blocking the light rays from entering through the light entrance surface 116B.

Third Embodiment

Figure 12:
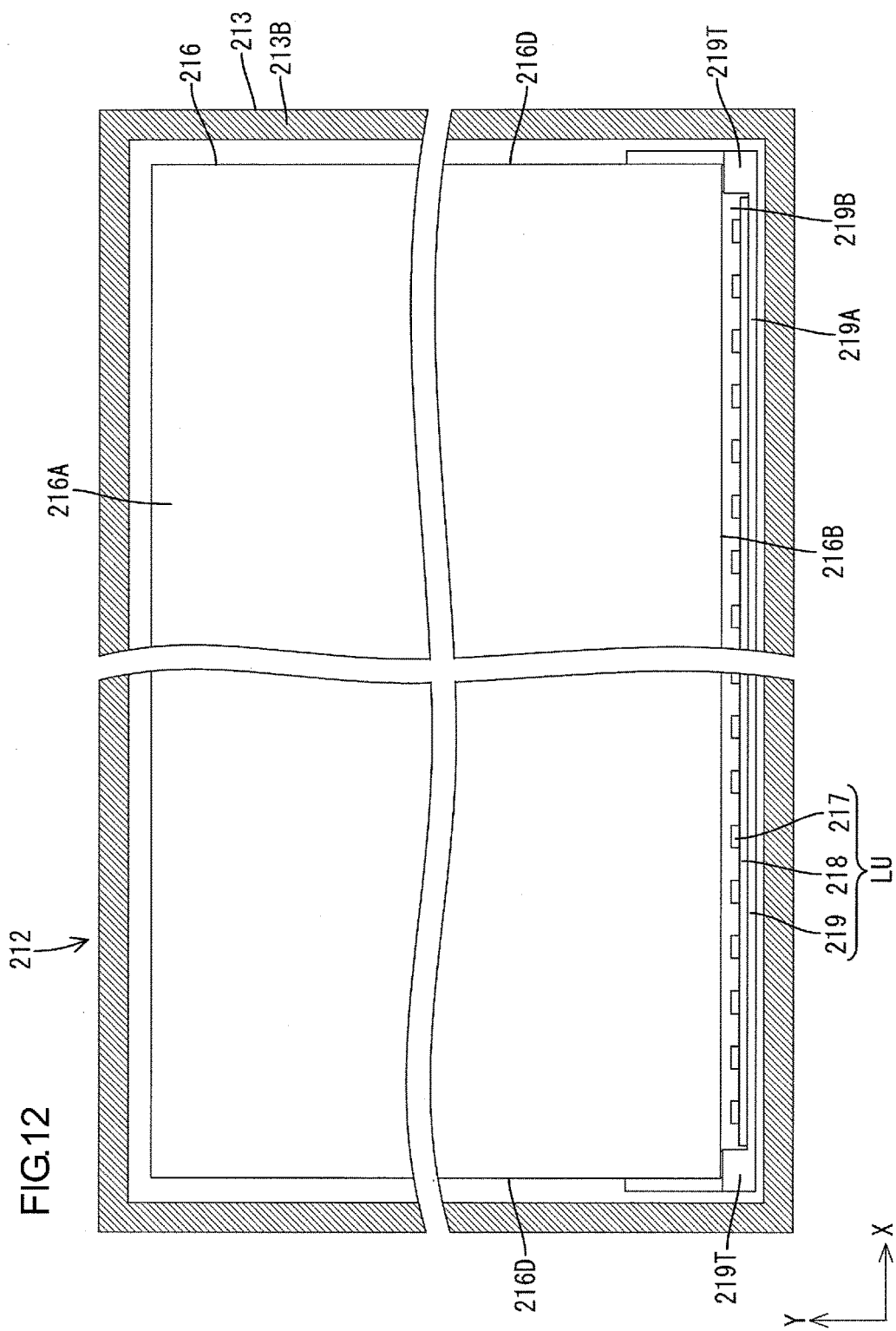
FIG. 12 is a plane cross-sectional view of a backlight device viewed from a light exit surface side of a light guide plate according to a third embodiment.
Figure 13:
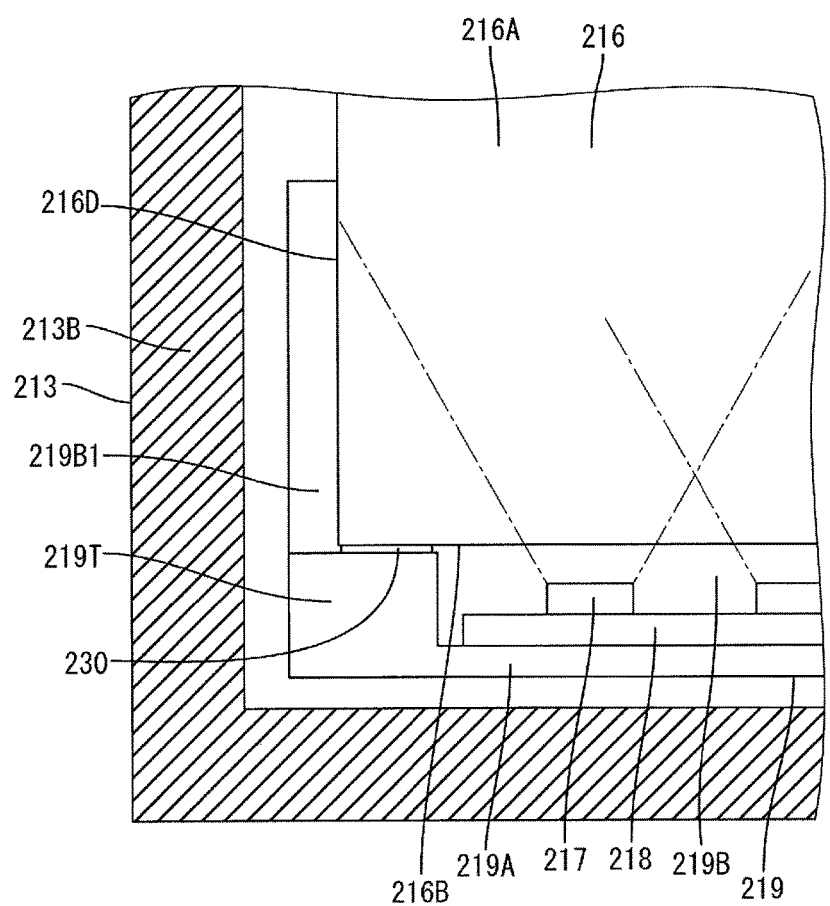
FIG. 13 is a magnified plane cross-sectional view of one of projections and its vicinity in FIG. 12.

A third embodiment will be described with reference to the drawings. Projections 219T included in a heat dissipation member 219 in the third embodiment are different in shape from those in the first embodiment. Other configurations are same as those in the first embodiment and therefore, the constructions, functions, and effects similar to those of the first embodiment will not be described. In FIGS. 12 and 13, portions represented by numerals that are equal to the numerals in FIGS. 12 and 13 with 200 added thereto have the same configurations as the portions represented by the respective numerals in the first embodiment.

As illustrated in FIGS. 12 and 13, in a backlight device 212 according to the third embodiment, the projections 219T project from two ends of a longitudinal dimension of a bottom plate portion 219B (the X-axis direction) toward the front and continue to an upstanding portion 219A. In other words, the projections 219T are at two ends of a longitudinal dimension of the upstanding portion 219A (the X-axis direction). One of surfaces of each projection 219T faces a light entrance surface 216B. A portion of one of the surfaces of the projection 219T is opposed to an end of the light entrance surface 216B with respect to its longitudinal dimension. Similar to the second embodiment, the portion of the projection 219T opposed to the light entrance surface 216B is attached to the light entrance surface 216B with an adhesive tape 230 in between. According to this configuration, the projections 219T are stopped at the light entrance surface 216B that is one of edge surfaces of a light guide plate 216. Thus, the distance between LEDs 217 and the light entrance surface 216B is maintained constant.

In this embodiment, the projections 219T continue to upstanding portion 219A of the heat dissipation member 219. In comparison to a configuration in which the projections 219T that project from the bottom plate portion 219B are spaced from the upstanding portion 219A, rigidity of the projections 219T of this embodiment is increased. Accordingly, the distance between the LEDs 217 and the light entrance surface 216B is efficiently maintained constant by the projections 219T.

Fourth Embodiment

A fourth embodiment will be described with reference to the drawings. In the fourth embodiment, the arrangement of LED units LU is different from that in the first embodiment. Other configurations are same as those in the first embodiment and therefore, the constructions, functions, and effects similar to those of the first embodiment will not be described. In FIG. 14, portions represented by numerals that are equal to the numerals in FIG. 14 with 300 added thereto have the same configurations as the portions represented by the respective numerals in the first embodiment.

As illustrated in FIG. 14, a backlight device 312 according to the fourth embodiment, two long edge surfaces of a light guide plate 316 are configured as light entrance surfaces 316B and two LED units LU are arranged opposite to the respective light entrance surfaces 316B. Configurations of each of the LED units LU in the third embodiment are similar to that in the first embodiment. That is, the arrangement and configurations of projections 319T included in each of heat dissipation members 319 are similar to those in the first embodiment. Even with the configuration that the two long edge surfaces of the light guide plate 316 are configured as the light entrance surfaces 316B, distances between the light entrance surfaces 316B and their corresponding LEDs 317 are restricted by the respective projections 319T. Therefore, a preferable optical design can be maintained with reducing the variation in size of components.

Modifications of the above embodiments will be described below.

(1) In each of the above embodiments, the projections that project from the bottom plate portion of the heat dissipation member have a block-like shape. However, the shapes of the projections are not limited thereto. The projections may project from the bottom plate portion with tapering.

(2) In each of the above embodiments, the projections project from the respective edges of the long dimension of the bottom plate portion; however, the positions and the number of the projections are not limited thereto.

(3) In the above embodiments, one or two of the long edge surfaces of the light guide plate are configured as the light entrance surface; however, any of the edge surfaces of the light guide plate may be configured as the light entrance surface. With the configuration in which the LED unit includes the heat dissipation member that includes the projections and is arranged opposite the light entrance surface, the distance between the light entrance surface and the corresponding LEDs is maintained constant even when the light guide plate thermally expands.

(4) Other than the above embodiments, configurations of the heat dissipation member including the bottom plate portion and the upstanding portion may be altered as appropriate.

(5) Other than the above embodiments, configurations of the projections may be altered as appropriate.

(6) In each of the above embodiments, the liquid crystal display device including the liquid crystal panel as a display panel is used. However, the technology can be applied to display devices including other types of display panels.

The embodiments have been described in detail. However, the above embodiments are only some examples and do not limit the scope of the claimed invention. The technical scope of the claimed invention includes various modifications of the above embodiments.

EXPLANATION OF SYMBOLS

TV: television device, LDU: liquid crystal display device, PWB: power source board, MB: main board, CTB: control board, CV: cover, ST: stand, LU: LED unit, 10: liquid crystal display device, 11: liquid crystal panel, 12, 112, 212, 312: backlight device, 13, 113, 213, 313: frame, 14: chassis, 15: optical member, 16, 116, 216, 316: light guide plate, 16B, 116B, 216B, 316B: light entrance surface, 16S, 316S: cut portion, 17, 117, 217, 317: LED, 18, 118, 218, 318: LED board, 19, 119, 219, 319: heat dissipation member, 19T, 119T, 219T, 319T: projection, 20: reflection sheet, 119T1: attaching portion, 119T2: contact portion, 130, 230: adhesive tape.

The invention claimed is:

1. A lighting device comprising:
a light source;
a light guide plate including a light entrance surface that is at least one of edge surfaces thereof, a light exit surface that is a plate surface thereof, and an opposed surface that is an opposite side from the light exit surface, the light entrance surface through which light from the light source enters the light guide plate, the light exit surface through which the light from the light source exits the light guide plate;

a heat dissipation member having a heat dissipating property and including a bottom plate portion and an upstanding portion, the bottom plate portion extending along the opposed surface on an opposed surface side of the light guide plate, the upstanding portion extending from the bottom plate portion toward the light exit surface, the bottom plate portion including a projection extending therefrom toward the light exit surface and facing at least one of the edge surfaces, the projection being stopped at the at least one of the edge surfaces and configured to restrict a distance between the light source and the light entrance surface; and a urethane member attached to a peripheral surface of the projection.

2. The lighting device according to claim 1, further comprising a reflection sheet having reflectivity and disposed between the opposed surface of the light guide plate and the bottom plate portion of the heat dissipation member, wherein the projection is stopped at the reflection sheet and configured to restrict a movement of the reflection sheet in a direction perpendicular to the light entrance surface.

3. The lighting device according to claim 1, wherein the edge surfaces of the light guide plate includes an adjacent edge surface that is adjacent to the light entrance surface, and the adjacent edge surface includes a cut portion that faces the projection and in which the projection is fitted.

4. The lighting device according to claim 3, wherein the light guide plate includes the cut portion not overlapping a range of a distribution of light that enters through the light entrance surface.

5. The lighting device according to claim 1, wherein the projection includes an attaching portion attached to the light entrance surface.

6. The lighting device according to claim 5, wherein the attaching portion is attached to a portion of the light entrance surface not overlapping a range of a distribution of light that enters through the light entrance surface.

7. The lighting device according to claim 5, wherein the edge surfaces of the light guide plate includes an adjacent edge surface that is adjacent to the light entrance surface, and the projection includes a contact portion that is in contact with the adjacent edge surface.

8. The lighting device according to claim 1, wherein the projection continues to the upstanding portion.

9. The lighting device according to claim 1, further comprising a reflection member having reflectivity, the reflection member being attached to a peripheral surface of the projection.

10. The lighting device according to claim 1, further comprising a light source board including a plate surface on which the light source is mounted and another plate surface fixed to the upstanding portion.

11. A display device comprising:

the display device according to claim 1, and a display panel using light from the lighting device.

12. The display device according to claim 11, wherein the display panel is a liquid crystal panel including liquid crystals.

13. A television device comprising the display device according to claim 11.

* * * * *